United States Patent
Pandharipande et al.

(10) Patent No.: US 9,838,993 B2
(45) Date of Patent: Dec. 5, 2017

(54) CONTROLLING BEACONING IN A POSITIONING SYSTEM

(71) Applicant: PHILIPS LIGHTING HOLDING B.V., Eindhoven (NL)

(72) Inventors: Ashish Vijay Pandharipande, Eindhoven (NL); Hongming Yang, Eindhoven (NL); Xiangyu Wang, Eindhoven (NL); Armand Michel Marie Lelkens, Heerlen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,266

(22) PCT Filed: Dec. 30, 2014

(86) PCT No.: PCT/EP2014/079415
§ 371 (c)(1),
(2) Date: Jul. 7, 2016

(87) PCT Pub. No.: WO2015/104199
PCT Pub. Date: Jul. 16, 2015

(65) Prior Publication Data
US 2016/0374045 A1     Dec. 22, 2016

(30) Foreign Application Priority Data

Jan. 7, 2014 (EP) ................................. 14150333

(51) Int. Cl.
*H04W 64/00* (2009.01)
*G01C 21/20* (2006.01)
(Continued)

(52) U.S. Cl.
CPC .......... *H04W 64/00* (2013.01); *G01C 21/206* (2013.01); *G01S 1/68* (2013.01); *G01S 1/70* (2013.01);
(Continued)

(58) Field of Classification Search
CPC ..... H04W 64/00; H04W 4/023; H04W 4/043; G01C 21/206; G01S 1/68; G01S 1/70;
(Continued)

(56) References Cited

U.S. PATENT DOCUMENTS 7,548,731 B1    6/2009   Anver et al.
8,285,484 B1   10/2012   Lau et al.
(Continued)

FOREIGN PATENT DOCUMENTS

WO    2009046767 A1    4/2009
WO    2013088279 A1    6/2013

OTHER PUBLICATIONS

Zanca, Giovanni, et al., "Experimental Comparison of RSSI-Based Localization Algorithms for Indoor Wireless Sensor Networks," Proc. of the Workshop on Real-World Wireless Sensor Networks, 2008 (5 Pages).

*Primary Examiner* — Kashif Siddiqui
(74) *Attorney, Agent, or Firm* — Meenakshy Chakravorty

(57) ABSTRACT

A location system comprising: a location network comprising a plurality of reference nodes and at least one controller. Each reference node is operable to transmit a respective beaconing signal from which a respective measurement can be taken by a mobile device for use in determining a location of the mobile device. The at least one controller is configured to control whether and/or how often one or more signals of the location system are transmitted to be used in determining the location of the mobile device, the control being based on feedback from at least one determination of (Continued)

the location of the mobile device relative to the reference nodes.

11 Claims, 4 Drawing Sheets

(51) Int. Cl.
| | | |
|---|---|---|
| *G01S 1/68* | (2006.01) | |
| *G01S 1/70* | (2006.01) | |
| *G01S 1/72* | (2006.01) | |
| *G01S 5/00* | (2006.01) | |
| *G01S 5/16* | (2006.01) | |
| *G01S 5/18* | (2006.01) | |
| *G01S 1/74* | (2006.01) | |
| *H04W 4/04* | (2009.01) | |
| *H04W 52/02* | (2009.01) | |
| *H04W 4/02* | (2009.01) | |

(52) U.S. Cl.
CPC ............... *G01S 1/725* (2013.01); *G01S 1/74* (2013.01); *G01S 5/0036* (2013.01); *G01S 5/16* (2013.01); *G01S 5/18* (2013.01); *H04W 4/023* (2013.01); *H04W 4/043* (2013.01); *H04W 52/0225* (2013.01); *Y02B 60/50* (2013.01)

(58) Field of Classification Search
CPC .......... G01S 1/725; G01S 5/0036; G01S 5/16; G01S 5/18
See application file for complete search history.

(56) References Cited

U.S. PATENT DOCUMENTS

| | | |
|---|---|---|
| 2003/0119530 A1 | 6/2003 | Rankin |
| 2007/0155489 A1* | 7/2007 | Beckley .............. G07F 17/3218 463/29 |
| 2010/0255781 A1* | 10/2010 | Wirola .................... G01S 19/34 455/41.2 |
| 2011/0227791 A1 | 9/2011 | Lin et al. |
| 2013/0142188 A1 | 6/2013 | Roberts et al. |

* cited by examiner

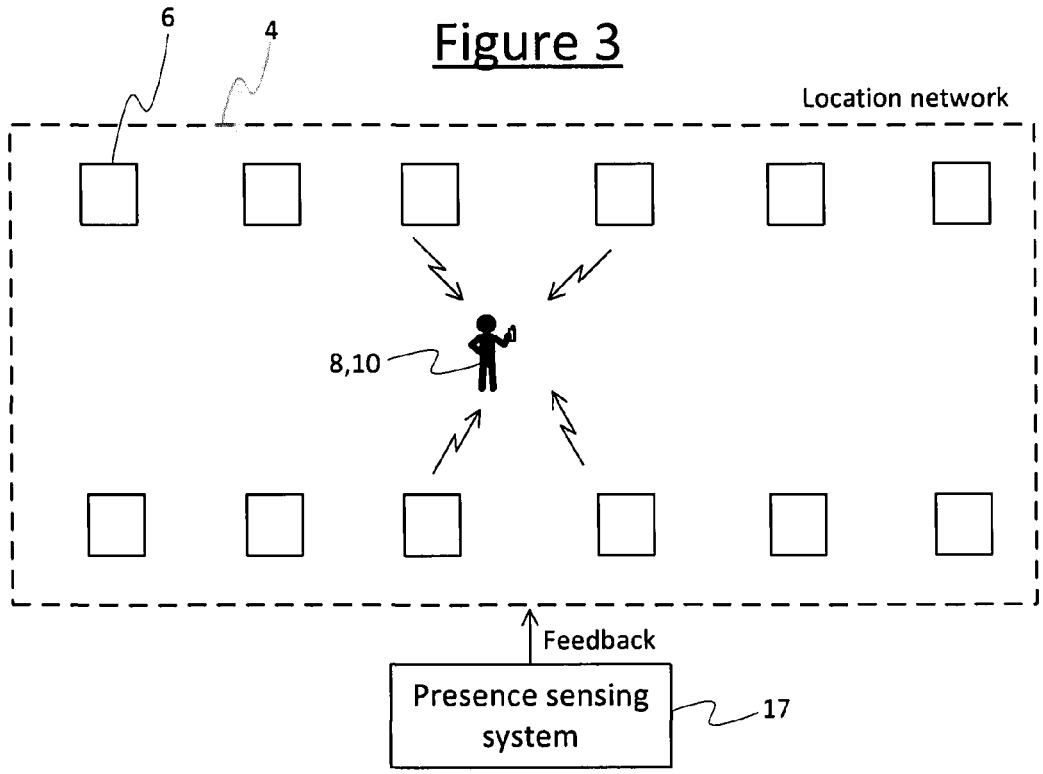
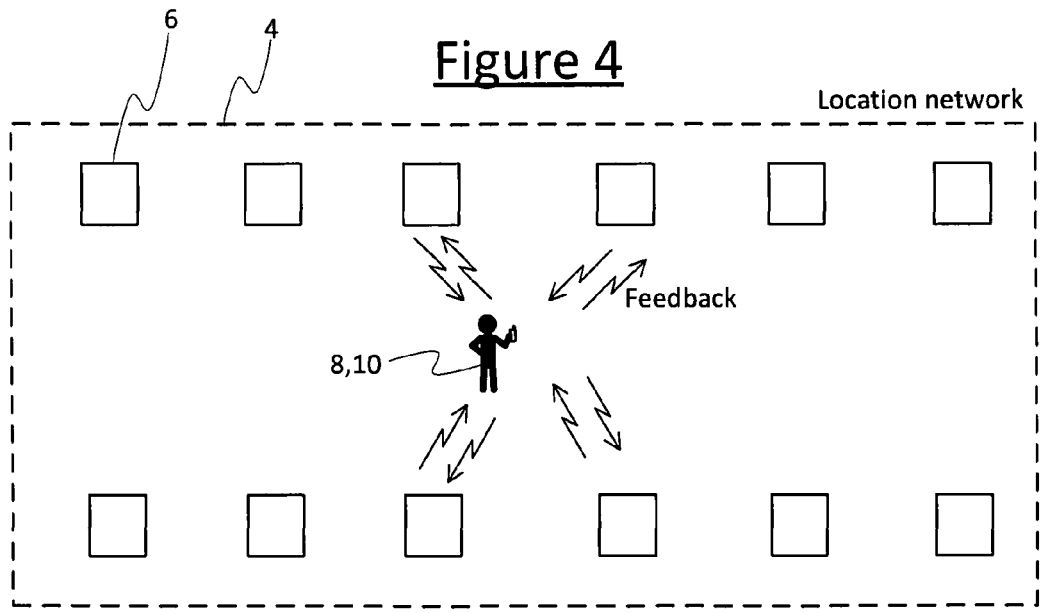

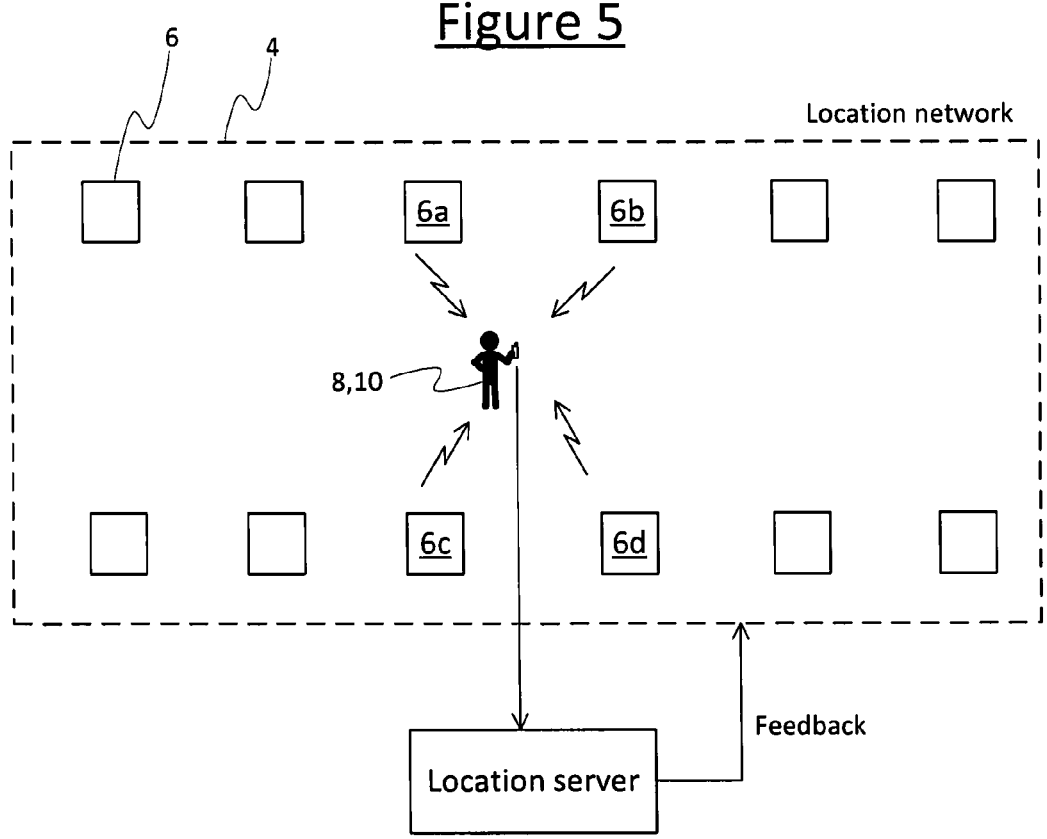
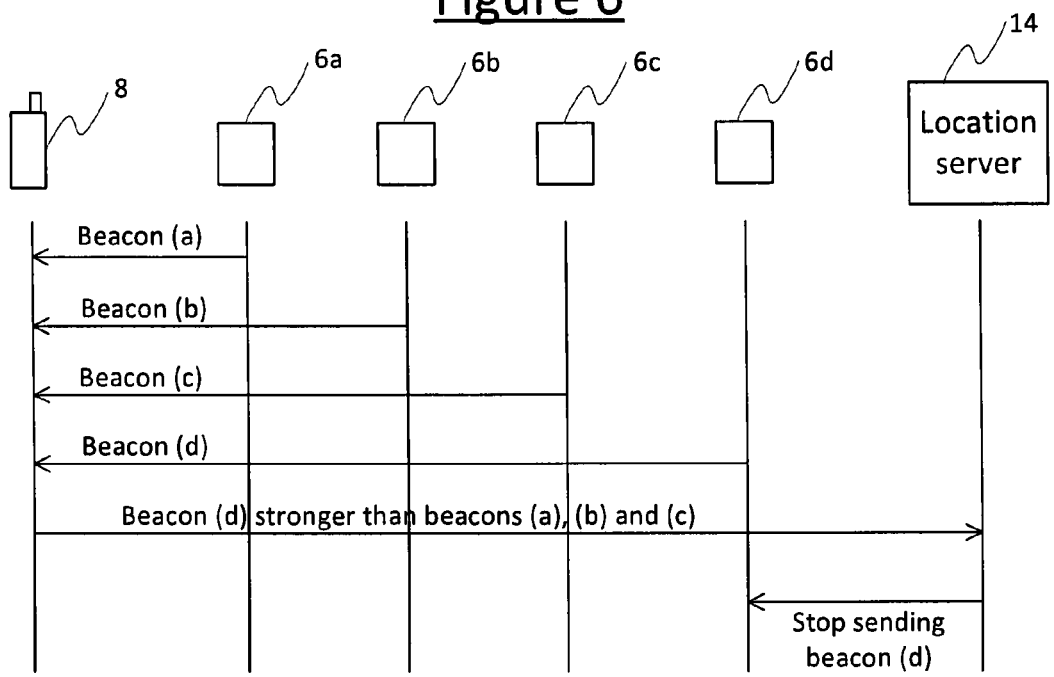

CONTROLLING BEACONING IN A POSITIONING SYSTEM

CROSS-REFERENCE TO PRIOR APPLICATIONS

This application is the U.S. National Phase application under 35 U.S.C. §371 of International Application No. PCT/EP2014/079415, filed on Dec. 30, 2014, which claims the benefit of European Patent Application No. 14150333.4, filed on Jan. 7, 2014. These applications are hereby incorporated by reference herein.

TECHNICAL FIELD

The present invention relates to a location network for determining the location of a mobile device.

BACKGROUND

In an indoor positioning system, the location of a wireless device such as a mobile user terminal can be determined with respect to a location network comprising multiple anchor radios. These anchors are wireless nodes whose locations are known a priori, typically being recorded in a location database which can be queried to look up the location of a node. The anchor nodes thus act as reference nodes for location. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

As well as indoor positioning, other types of positioning system are also known, such as GPS or other satellite-based positioning systems in which a network of satellites acts as the reference nodes. Given signal measurements from a plurality of satellites and knowledge of those satellites' positions, the location of the mobile device may be determined based on similar principles.

The determination of the device's location may be performed according to a "device-centric" approach or a "network-centric" approach. According to a device centric approach, each reference node emits a respective signal which may be referred to as a beacon or beaconing signal. The mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

SUMMARY

If an indoor positioning system includes a large number of anchor nodes then the mobile device may receive a large number of beacon signals. Whilst a greater number of signal measurements tends to improve positioning accuracy/reliability, receiving and processing a large number of beacon signals is likely to cause an undesirable drain on the battery of the mobile device. A larger number of signals may also increase network load and/or delay. Similar observations may be made in relation to other types of localization system, or other signals transmitted for the purpose of localization such as the signal measurements transmitted from the mobile device to location server in a device-assisted case. The present disclosure therefore provides one or more mechanisms for adaptively controlling the occurrence of signals transmitted in a localization system, e.g. enabling and/or disabling the respective beacon signals of one or more anchor nodes of the system, or controlling the rate at which they emit instances of their respective beaconing signals.

According to one aspect disclosed herein, there is provided a location system comprising a location network, the location network comprising a plurality of reference nodes. Each reference node is operable to transmit a respective beaconing signal from which a respective measurement can be taken by a mobile device for use in determining a location of the mobile device. Further, the location system also comprises at least one controller, configured to control whether and/or how often one or more signals of the location system are transmitted to be used in determining the location of the mobile device. The control is based on feedback from at least one determination of the location of the mobile device relative to the reference nodes.

In embodiments, said one or more signals of the location system comprise the beaconing signals emitted from the reference nodes, i.e. so the at least one controller is configured to use said feedback to control whether and/or how often the beaconing signals are emitted. Thus an actual determination of the physical location of the mobile device is used to inform a decision as to which anchor nodes should transmit, or how often. Hence the burden on the mobile device and/or the location network may be reduced by avoiding broadcasting geographically less relevant signals.

Additionally, said one or more signals of the location system may comprise an uplink signal transmitting the measurements or partially processed versions of said measurements from the mobile device to a location server (where used to determine the location of the mobile device). Thus the burden on the uplink of the may be reduced.

In embodiments the at least one controller may be configured to receive said feedback from an additional location system other than said location system. For example, the additional location system may comprise a presence sensing system which detects a location of a user carrying the mobile device, the feedback being based on the location of the user as sensed by the presence sensing system. E.g. the presence sensing system may be an occupancy sensing system which detects the location of the user within a room or corridor (with some spatial granularity). The presence sensing system may detect presence of the user based on an ultrasound or infrared presence sensing technology.

In further embodiments, the at least one controller may be configured to receive said feedback from the mobile device, the feedback being based on said location as determined at the mobile device using said measurements.

In further embodiments, the at least one controller is configured to receive said feedback from a location server, the feedback being based on said location as determined at the location server using the measurements or partially processed versions of said measurements submitted from the mobile device.

In yet further embodiments, the at least one controller may be configured to receive said feedback from an application server providing a location related service to said mobile device in dependence on the location of the mobile device, the feedback being based on the mobile device being granted access to the location based service.

Said controlling of the beaconing signals may comprise, for each of one or more of the reference nodes: activating the respective beaconing signal on condition that the location of the mobile device is within a proximity of the respective reference node, and/or deactivating the respective beaconing signal on condition that the location of the mobile device is outside a proximity of the respective reference node, Alternatively or additionally, said controlling of the beaconing signals may comprise, for each of one or more of the reference nodes: increasing a number of instances of the respective beaconing signal transmitted per unit time on condition that the location of the mobile device is within a proximity of the respective reference node, and/or decreasing a number of instances of the respective beaconing signal transmitted per unit time on condition that the location of the mobile device is outside a proximity of the respective reference node.

In further embodiments, the reference nodes may be dedicated anchor nodes of an indoor location network. The at least one controller may comprise a plurality of controllers, one for each reference node with each being configured to control the occurrence of the beacon signal transmitted from that reference node. Alternatively a common controller may be provided for two or more of the reference nodes.

According to another aspect disclosed herein, there may be provided a computer program product for use in a location network comprising a plurality of reference nodes, each being operable to transmit a respective beaconing signal from which a respective measurement can be taken by a mobile device for use in determining a location of the mobile device; wherein the computer program product comprises code embodied on a computer-readable storage medium and configured so as when executed on one of the reference nodes to control whether and/or how often one or more signals of said reference node are transmitted to be used in determining the location of the mobile device, the control being based on feedback from a determination of the location of the mobile device relative to the reference nodes.

BRIEF DESCRIPTION OF THE DRAWINGS

To assist the understanding of the present disclosure and to show how embodiments may be put into effect, reference is made by way of example to the accompanying drawings in which:

FIG. 3 is a schematic block diagram of a system for controlling the emission of beaconing signals from the anchor nodes of an indoor positioning system, FIG. 4 is a schematic block diagram of another system for controlling the emission of beaconing signals from the anchor nodes of an indoor positioning system, FIG. 5 is a schematic block diagram of another system for controlling the emission of beaconing signals from the anchor nodes of an indoor positioning system, FIG. 6 is a schematic signaling chart showing the operation of a system for controlling emission of beaconing signals.

DETAILED DESCRIPTION OF EMBODIMENTS

Figure 1:
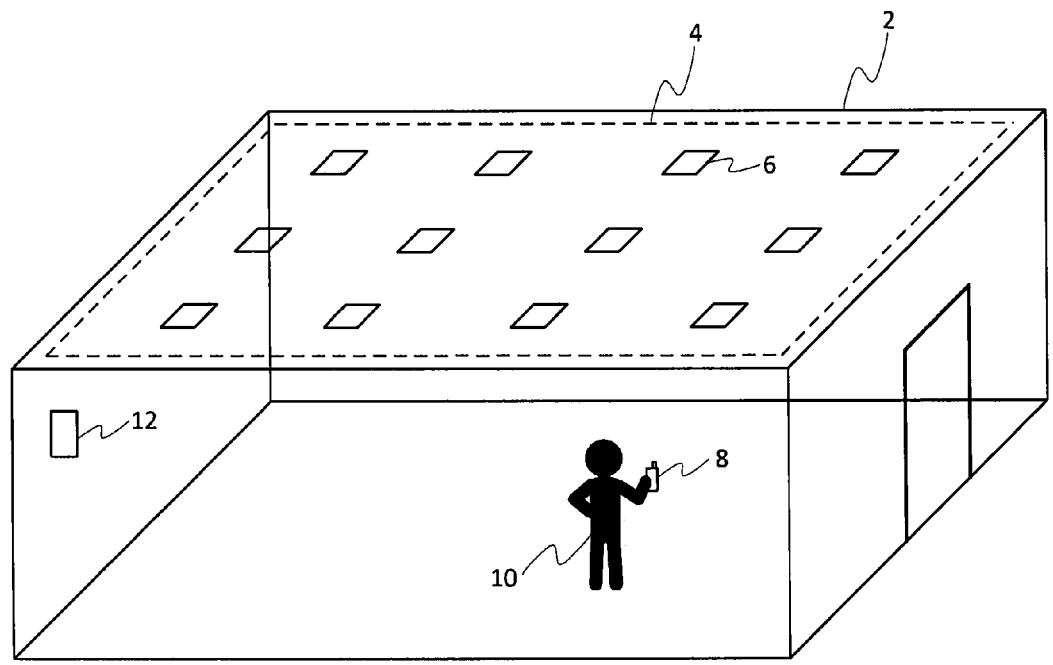
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations, as long as their locations can still be known. For example the reference nodes could instead be satellites of a satellite based positioning system such as GPS, GLONASS or Gallileo. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g.

carried or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12 or object about which it is disposed.

Figure 2:
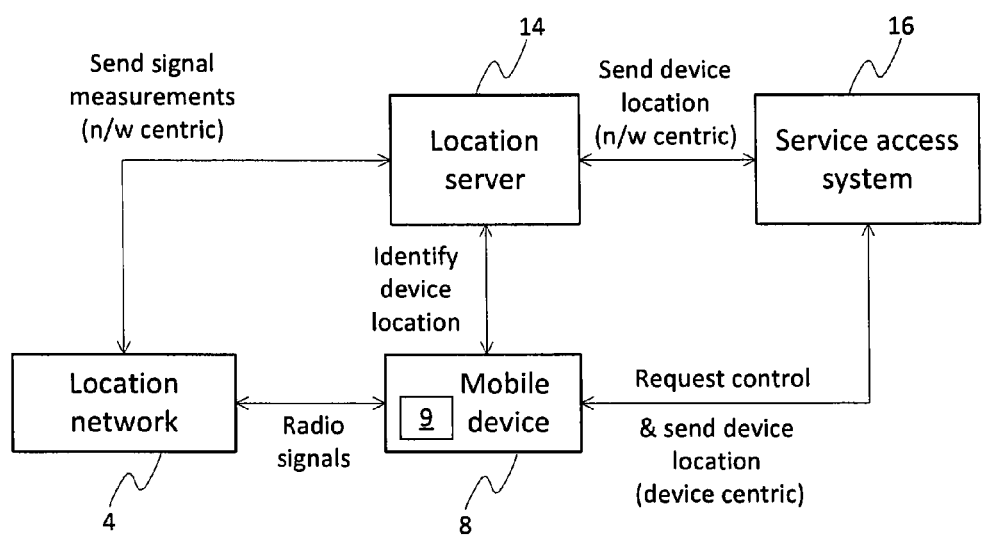
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi or ZigBee or Bluetooth, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi, ZigBee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi, ZigBee or Bluetooth, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, 14 and for conciseness the various possibilities will not necessarily be repeated each time.

The mobile device 8 comprises a location module 9 configured to enable the mobile device to operate in accordance with the following. The location module 9 may be implemented in software stored on storage of the mobile device 8 and configured so as when executed on a processor of the mobile device 8 to perform the described operations. Alternatively it is not excluded that some or all of the functionality enabled by the location module 9 may be implemented in dedicated hardware circuitry, or configurable or reconfigurable circuitry.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location. In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In one example of a hybrid approach, the nodes 6 may take the measurements but then send them to the mobile device 8.

If such a signal measurement is available from each of a plurality of the anchor nodes 6, it is possible to determine the location of the mobile device 8 relative to the location network 4 using a technique such as trilateration, multilateration or triangulation. By combining this relative location with a known location of the anchor nodes 6 used in the calculation, it is then possible to determine the "absolute" location of the mobile device 8. The absolute location may for example refer to a geographic location in terms of the location on a globe or a map, or may refer to a location on a floorplan of a building or complex, or any real-world frame of reference having a wider meaning than simply knowing the location relative to the location network 4 alone. In a device centric approach the mobile device looks up the locations of the relevant nodes 6 by querying the location server 14 (e.g. via the wireless access point 12), or alternatively may receive the respective location along with the signal from each node 6. The mobile device 8 then performs the calculation to determine the absolute location at the device 8 itself. In a network centric approach on the other hand, the nodes 6 submit the signal measurements they took to the location server 14 (e.g. via the wireless access point 12), and the location server 14 performs the calculation of the absolute location at the server 14. In an example of an assisted or hybrid approach, the mobile device 8 may take the measurements of signals from the nodes 6 but submit them to the location server 14 in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

Note that FIG. 2 shows various communications with arrows in all directions to illustrate the possibility of either device centric or network centric approaches, but in any given implementation not all the communications shown need be bidirectional or indeed present at all.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8 (e.g. providing the device 8 with information on exhibits as the user 10 walks about a museum, or information about products as the user 10 walks about a shop or mall); or accepting location dependent payments from the mobile device on condition that the device 8 is present in a certain region, e.g. payments in shops, payment of road tolls, "pay as you drive" car rental, or entrance fees to venues or attractions.

For instance, in embodiments the service access system 16 is configured to control access to a lighting network installed or otherwise disposed in the environment 2. In this case the environment 2 comprises a plurality of luminaires (not shown) and a lighting control system comprising the access system 16. The luminaires may for example be installed in the ceiling and/or walls, and/or may comprise one or more free standing units. The luminaires are arranged to receive lighting control commands from the controller. In embodiments this may also be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi, ZigBee or Bluetooth. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location.

Note that FIG. 2 shows arrows in all directions to illustrate the possibility of either device centric or network centric approaches, and both approaches are described herein by way of comparison. However, the present disclosure is concerned specifically with a device centric approach whereby the signal measurements are taken by the mobile device and the location calculation is performed at the mobile device, or with a device-assisted approach being an assisted approach whereby the signal measurements are taken by the mobile device and the raw or partially processed measurements are submitted from the mobile device to a location server where they are used to calculate the device' location.

In device-centric positioning systems, to improve positioning accuracy and/or reliability, it is generally desirable to receive and process more beacons either in time (more measurements from anchor nodes) or space (signal measurements from more anchor nodes). However this is at the expense of battery power. Further, this places burden on network bandwidth and increases delay on the link between the location network and the mobile device.

In device-assisted positioning systems, excessive signal measurements place a burden on the link between the location network and the location server. Further, there is an adverse impact on power consumption at the device due to excessive transmissions and receptions of signal measurements.

The following provides some exemplary beaconing strategies which may be used to obtain positioning accuracy and/or reliability while not affecting battery power or network bandwidth by an adverse amount.

In one embodiment, a presence detection system enables the respective beacon signals of any anchor nodes in its vicinity, in response to detecting presence in its vicinity. For example anchor node transmissions are controlled via feedback from an occupancy system that has determined user presence in certain regions that are then mapped to certain anchor nodes. In another embodiment, the mobile user device itself provides feedback to enable and/or disable transmissions from certain anchor nodes and/or control the frequency of transmissions, based on an initial fix or relative distance from a node. For example the system may receive from the mobile device an indication of which beacon signals to deactivate, such as to deactivate any beacon signal which at the mobile device had an RSSI below a threshold.

Figure 8:
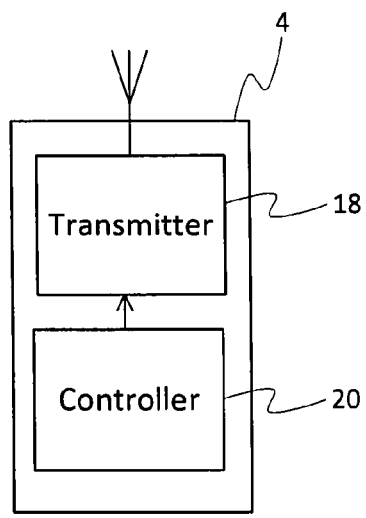
FIG. 8 is a schematic block diagram of an anchor node.

FIG. 8 gives an illustration of an anchor node 6. Each anchor node 6 of the location network 4 comprises a respective transmitter 18 which is operable to transmit one or more respective instances of its beaconing signal. Each anchor node 6 also comprises a respective controller 20 coupled to the respective transmitter of that node, configured to control the broadcast of the one or more respective instances of the node's beaconing signal (e.g. to control whether to enable or disable the transmission, or to control the number of instances per unit time). Alternatively some or all the anchor nodes 6 could be controlled by a common controller. Either way, the controller(s) 20 is/are configured to control the anchor nodes 6 so that only a subset of the anchor nodes 6 transmit (or fully transmit) at any one time, this being based on feedback from an external system other than the location network itself. The control may be based on any of the following types of feedback on the location of the mobile device 8, or on any combination of these.

Note that in any such embodiments, the determination the location of the mobile device 8, the feedback and the control of the beaconing from the anchor nodes 6 may be repeated over time, e.g. periodically, so the behavior of the anchor nodes 6 is updated to follow any movement of the device 8.

A first embodiment is illustrated in FIG. 3. Here, the external system is a separate presence sensing system 17 for sensing the presence of a (living) user. The presence sensing system comprises one or more presence sensors, such as passive infrared (PIR), active ultrasound, or RF or light-based sensors, which may be used to detect a location of a user within a space. For example many indoor spaces comprise occupancy systems for detecting the presence of a person within a room or corridor.

In the first embodiment, the existence of such additional information on the user's current location from the additional location system 17 is used to inform the decision as to whether or how often to transmit beaconing signals from the anchor nodes 6 of the location network 4. That is, a second location system is exploited to inform the beaconing of a first location system. For example the two systems could be working together to provide a more accurate fix than either could individually, or may happen to co-exist for different purposes.

In this embodiment, transmissions from anchor nodes 6 are triggered by the presence or occupancy system 17 (assuming the location of the user 10 and mobile device 8 are approximately the same). When user presence is determined by one or more occupancy sensors (e.g. which might be part of an external system such as a lighting system), the occupancy sensor system 17 provides feedback to a location server 14 or directly to the location network 4. This feedback is used to selectively choose anchor nodes 6 that would best be used to locate the user.

Other examples for the second system could also be possible, e.g. a separate satellite-based system such as GPS being used to inform the beaconing by the indoor positioning system.

A second embodiment is illustrated in FIG. 4. Here, in addition to the beaconing signals from the anchor nodes 6 to the mobile device, the mobile device 8 also emits a signal from which at least some of the anchor nodes 6 make signal measurements (such as RSSI). The signal measurements provide information on the relative distance between the mobile device 8 and the respective anchor nodes 6. If the RSSI exceeds a particular threshold, then anchor nodes 6 are triggered to transmit beacons. By selective transmissions from anchor nodes 6, both receiving and processing power may be conserved at the mobile device's side.

A third embodiment is illustrated in FIG. 5. In this case, the location server 14 is arranged to provide the feedback on the current location of the mobile device 8. Either the mobile device 8 calculates its location itself (device centric), or it submits the measurements it took to the location server for the location to be calculated there (assisted approach). Either way, the location server 14 then has information on the location of the device 8 which the server 14 can use to make selections about the beaconing from the anchor nodes 6. The location server 14 may select to activate the beacon transmissions from only a subgroup of the anchor nodes within a certain vicinity around the mobile device's current location, or reduce the rate of transmission of anchor nodes outside a certain vicinity. For example as the mobile device 8 moves within that vicinity between feedback periods, then the subgroup of beaconing anchor nodes 6 will be able to follow the location of the mobile device 8.

In a variant, the feedback may be provided directly from the mobile device 8 to the location network 4. Optionally, the process may also be informed by further location related information. For example, the mobile device 8 may obtain an initial fix using active signal measurements and then use passive on-board sensor (e.g., compass, accelerometer) measurements to track. Such a processing adaptation is signaled to the location network 4 in the form of disabling or reduction in frequency of beacon transmissions. In the absence of a position fix or inability to access the desired location-based service, beacons may be additionally enabled or the frequency of beacon transmissions may be increased.

FIG. 6 shows another variant. Here, the mobile device 8 listens to the signals from a plurality of anchor nodes 6, e.g. those labeled 6a-6d, and takes a respective signal measurement from each such as the signal strength (e.g. RSSI). This again gives information on the relative distance of the mobile device 8 from the respective nodes 6a-6d. Of these, it determines which subgroup of the anchor nodes 6 the mobile device 8 is closest to and are thus to be used in localization, and which one or more are further away and so can have their beaconing signals disabled or reduced in rate. For example, say the mobile device can currently hear four signals from four respective anchor nodes 6a-6d. Of these, it so happens that the signals from 6a, 6b and 6c are the strongest (as detected at the mobile device 8), so 6d is furthest away, and in this example mobile device 8 only requires three signals for localization. Accordingly, it instructs the location network 4 (either directly instructing the individual anchor nodes 6 or via a location server 14) to disable the transmission of the beaconing signal from the weakest (furthest) node 6d, or to reduce the rate of transmission from that node 6d.

In the case where a beaconing signal is disabled, some mechanism may be required to eventually re-enable it in case the mobile device 8 later moves closer and it would become useful. For example each node 6 could be reconfigured so as, when disabled, to send out another beacon at random intervals, or after a certain timeout period. If a node 6 is re-heard by the mobile device 8 and deemed now to be useful or worthwhile because the mobile device 8 is now closer to it, it will be re-enabled; but otherwise it will be disabled again. In the case where the rate is simply reduced, each node 6 will still get an occasional chance to send out its beacon and so if re-heard by the mobile 8 and deemed useful, its rate will be increased again.

Figure 7:
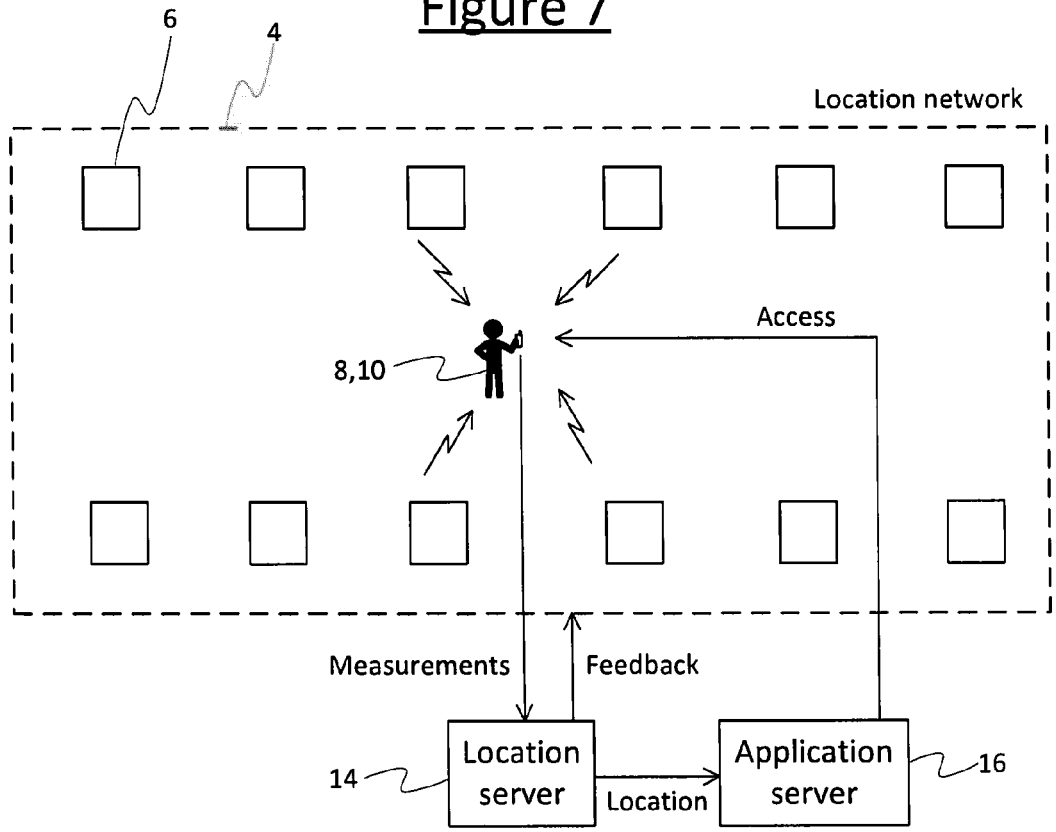
FIG. 7 is a schematic block diagram of yet another system for controlling the emission of beaconing signals from the anchor nodes of an indoor positioning system.

A fourth embodiment is illustrated in FIG. 7. In this embodiment, consider now a device-assisted positioning system wherein the mobile device 8 makes signal measurements and then sends these to a location server 14 for determining the device's location. The location server 14 may also forward this location to a server of a location based service 16 to determine whether the mobile device 8 is granted access to the service, or the location server 14 may return the location to the mobile device 8 which in turn submits its own location to the location based service 16 in order to determine access. In such a system, larger number of measurements leads to greater power consumption on account of both reception and transmission of signal measurements.

In this case, reliable access to a location based service 16 granted from an application server provides the external feedback on the mobile device's location. If the mobile device 8 successfully gains access to the location based service 16, this means its location has been successfully determined and the mobile device 8 or location server 14 instructs the beaconing rate from the anchor nodes 6 to be adapted or controls which to disable. For example, it may be determined that while the mobile device 8 has access to a location based service, no further localization is needed and all anchor nodes 6 can be instructed to disable or reduce the rate of their transmissions.

In addition to controlling the beaconing signals from the anchor nodes 6, in a device-assisted case any of the above techniques (or any combination of them) may also be used to control whether or how often the signal measurements (or partially processed measurements) are submitted on the uplink from the mobile device 8 to the location server 14. E.g. in a version of the fourth embodiment, If the mobile device 8 successfully gains access to the location based service 16, the mobile device 8 may stop forwarding any further signal measurements to the location server 14, or adapt the rate of forwarding such measurements.

It will be appreciated that the above embodiments have been described by way of example only.

For instance, the scope of the disclosure is not limited to using dedicated anchor nodes of an indoor positioning system as reference nodes for localization. Alternatively or additionally, the reference nodes may comprise other nodes having a knowable location, e.g. other mobile devices that have already been positioned can be used as a reference for location. Further, the beaconing signals are not restricted to being radio, but could alternatively or additionally comprise signals using other modalities such as ultrasound, modulated visible light, etc.

Furthermore, the feedback may be implemented in a variety of ways. In all cases the feedback results from an actual determination of the mobile device's location, i.e. a location fix computed based on a plurality of beaconing signals (or one or more such determinations). However, the feedback based on this could take a variety of forms.

For example in embodiments the presence system 17, location server 14 or mobile device 14 performs a determination of its mobile device, and then based on this determination sends a control signal to one or more of the reference nodes 6. The signal could indicate the location to the reference node 6 for the respective controller 20 at that reference node to assess the proximity of the mobile device 8; or alternatively the presence system 17, location server 14 or mobile device 14 could assess the proximity of the reference node 6 and the control signal then instructs it how to behave. In another embodiment, the control signal providing the feedback to the reference node 6 indicates the fact of whether or not the presence system 17, location server 14, location based application server 16 or mobile device 14 has successfully obtained a location fix; or provides an instruction to the node 6 based on this fact.

In yet another embodiment, the control signal providing the feedback to the reference node 6 indicates a quality of the location fix computed by the presence system 17, location server 14, location based application server 16 or mobile device 14; or an instruction to the node 6 based on the quality of the fix. That is, the location of the mobile device 8 is computed, then a measure of quality of that fix is computed, and then the feedback and beaconing control is performed based on that measure. Thus in embodiments, the beaconing (e.g. rate of beaconing) may be controlled by degrees in dependence on how accurate a fix is currently being achieved.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A location system comprising:
   a location network comprising a plurality of reference nodes each configured to transmit a respective beaconing signal from which a respective measurement is taken by a mobile device for use in determining a location of the mobile device; and
   a plurality of controllers, one for each reference node with each being configured to control the occurrence of the beacon signal transmitted from that reference node, and further configured to control whether and/or how often one or more signals of the location system are transmitted to be used in determining the location of the mobile device, the control being based on feedback from at least one determination of the location of the mobile device relative to the reference nodes, wherein said one or more signals of the location system comprise the beaconing signals emitted from the reference nodes, the plurality of controllers being configured to control whether and/or how often the beaconing signals are emitted based on said feedback, wherein said controlling of the beaconing signals further comprises, for each of a plurality or more of the reference nodes:

when the location of the mobile device is within a proximity of the respective reference node, activating the respective beaconing signal or increasing a number of instances of the respective beaconing signal transmitted per unit time, and when the location of the mobile device is outside a proximity of the respective reference node, deactivating the respective beaconing signal or decreasing a number of instances of the respective beaconing signal transmitted per unit time.

2. The location system of claim 1, wherein said one or more signals of the location system comprise an uplink signal transmitting the measurements or partially processed versions of said measurements from the mobile device to a location server, to be used to determine the location of the mobile device.

3. The location system of claim 1, wherein the at least one controller is configured to receive said feedback from an additional location system other than said location system.

4. The location system of claim 3, wherein the additional location system comprises a presence sensing system which detects a location of a user carrying the mobile device, the feedback being based on the location of the user as sensed by the presence sensing system.

5. The location system of claim 4, wherein the presence sensing system is an occupancy sensing system which detects the location of the user within a room or corridor.

6. The location system of claim 4, wherein the presence sensing system detects presence of the user based on an ultrasound, or infrared, or light-based presence sensing technology.

7. The location system of claim 1, wherein the at least one controller is configured to receive said feedback from the mobile device, the feedback being based on said location as determined at the mobile device using said measurements.

8. The location system of claim 1, wherein the at least one controller is configured to receive said feedback from a location server, the feedback being based on said location as determined at the location server using the measurements or partially processed versions of said measurements submitted from the mobile device.

9. The location system of claim 1, wherein the at least one controller is configured to receive said feedback from an application server providing a location based service to said mobile device in dependence on the location of the mobile device, the feedback being based on the mobile device being granted access to the location based service.

10. The location system of claim 1, wherein the reference nodes are dedicated anchor nodes of an indoor location network.

11. A non-transitory computer program product for use in a location network comprising a plurality of reference nodes, each being operable to transmit a respective beaconing signal from which a respective measurement can be taken by a mobile device for use in determining a location of the mobile device; wherein the computer program product comprises code embodied on a computer-readable storage medium and configured so as when executed on one of the reference nodes to control whether and/or how often one or more signals of said reference node are transmitted to be used in determining the location of the mobile device, the control being based on feedback from a determination of the location of the mobile device relative to the reference nodes, wherein said one or more signals of the location system comprise the beaconing signals emitted from the reference nodes, the computer program product being configured to control whether and/or how often the beaconing signals are emitted based on said feedback, wherein said controlling of the beaconing signals further comprises, for each of a plurality or more of the reference nodes:

when the location of the mobile device is within a proximity of the respective reference node, activating the respective beaconing signal or increasing a number of instances of the respective beaconing signal transmitted per unit time, and when the location of the mobile device is outside a proximity of the respective reference node, deactivating the respective beaconing signal or decreasing a number of instances of the respective beaconing signal transmitted per unit time.

* * * * *